US 11,415,085 B2

(12) United States Patent
De Keyzer et al.

(10) Patent No.: US 11,415,085 B2
(45) Date of Patent: Aug. 16, 2022

(54) VEHICLE SYSTEM AND METHOD FOR INJECTING AN AQUEOUS SOLUTION IN THE COMBUSTION CHAMBER OF THE INTERNAL COMBUSTION ENGINE

(71) Applicant: PLASTIC OMNIUM ADVANCED INNOVATION AND RESEARCH, Brussels (BE)

(72) Inventors: Pierre De Keyzer, Brussels (BE); Laurent Duez, Uccle (BE); Stephane Leonard, Brussels (BE); Arthur Relave-Noiray, Brussels (BE); Beatriz Monge-Bonini, Brussels (BE)

(73) Assignee: PLASTIC OMNIUM ADVANCED INNOVATION AND RESEARCH, Brussels (BE)

( * ) Notice: Subject to any disclaimer, the term of this patent is extended or adjusted under 35 U.S.C. 154(b) by 0 days.

(21) Appl. No.: 16/627,625

(22) PCT Filed: Jul. 4, 2018

(86) PCT No.: PCT/EP2018/068128
§ 371 (c)(1),
(2) Date: Dec. 30, 2019

(87) PCT Pub. No.: WO2019/008058
PCT Pub. Date: Jan. 10, 2019

(65) Prior Publication Data
US 2021/0148308 A1    May 20, 2021

(30) Foreign Application Priority Data

| Jul. 5, 2017 | (EP) | 17305868 |
| Oct. 4, 2017 | (EP) | 17306329 |
| Mar. 28, 2018 | (EP) | 18164802 |

(51) Int. Cl.
*F02M 25/028* (2006.01)
*F02M 25/022* (2006.01)

(52) U.S. Cl.
CPC ...... *F02M 25/028* (2013.01); *F02M 25/0222* (2013.01); *F02M 25/0224* (2013.01)

(58) Field of Classification Search
CPC ............ F02M 25/028; F02M 25/0222; F02M 25/0224
See application file for complete search history.

(56) References Cited

U.S. PATENT DOCUMENTS

| 4,584,843 A * | 4/1986 | Pronger, Jr | F24F 5/0017 62/123 |
| 5,939,087 A * | 8/1999 | Hagiwara | C08K 5/0058 424/409 |

(Continued)

FOREIGN PATENT DOCUMENTS

| CN | 105518266 | 4/2016 |
| EP | 1 938 690 A1 | 7/2008 |

(Continued)

OTHER PUBLICATIONS

Grewell, D. A. et al, "Plastics and Composites Welding Handbook," Hanser Gardener, Apr. 24, 2003, pp. 23-25 (4 total pages).

(Continued)

*Primary Examiner* — Jacob M Amick
*Assistant Examiner* — Charles J Brauch
(74) *Attorney, Agent, or Firm* — Oblon, McClelland, Maier & Neustadt, L.L.P.

(57) ABSTRACT

The present invention relates to a vehicle system (80) configured for injecting an aqueous solution in an air intake line (12) upstream of a combustion chamber (14) of an internal combustion engine, or in the combustion chamber (14) of the internal combustion engine, said vehicle system (Continued)

(80) comprising the following constituents: •a tank (16) to store an aqueous solution; •a pump (18); •an air intake line (12) upstream of a combustion chamber (14) of an internal combustion engine; •one or more injectors (20) configured for injecting aqueous solution in the air intake line (12), in the combustion chamber (14) or both; •a feed line (22) configured in for feeding said injector (20) with aqueous solution pumped by the pump (18). In the vehicle system, at least a portion of at least one of the vehicle system constituents (16, 18, 12, 20, 22) or of a tank (16) component (24) is made of a polymer material. The polymer material—comprises an effective amount of at least one antimicrobial agent, or—has on its surface a surface coating containing at least one antimicrobial agent, the surface coating comprising between 0.001% by weight and 0.25% by weight of the at least one antimicrobial agent.

16 Claims, 5 Drawing Sheets

(56) References Cited

U.S. PATENT DOCUMENTS

| | | | |
|---|---|---|---|
| 6,511,052 B1 * | 1/2003 | Tonkin | H01M 8/04119 261/101 |
| 6,630,106 B1 | 10/2003 | Levy | |
| 7,179,418 B2 * | 2/2007 | Walker | C02F 1/02 422/1 |
| 2003/0025219 A1 | 2/2003 | Tonkin et al. | |
| 2003/0168025 A1 * | 9/2003 | Lesniak | F02D 41/144 123/25 A |
| 2005/0273921 A1 * | 12/2005 | Mattson | A61H 33/6073 4/541.1 |
| 2006/0029675 A1 | 2/2006 | Ginther | |
| 2010/0203161 A1 | 8/2010 | Gehri et al. | |
| 2012/0260886 A1 | 10/2012 | Mulye | |
| 2015/0068123 A1 * | 3/2015 | McAlister | C10L 3/00 48/197 FM |
| 2015/0128897 A1 | 5/2015 | Mulye | |
| 2016/0076440 A1 | 3/2016 | Mulye | |
| 2016/0227973 A1 * | 8/2016 | York | A61L 2/238 |
| 2016/0341092 A1 | 11/2016 | Daragon et al. | |
| 2017/0362997 A1 | 12/2017 | Mulye | |
| 2018/0128212 A1 | 5/2018 | Burak et al. | |

FOREIGN PATENT DOCUMENTS

| | | | |
|---|---|---|---|
| EP | 1 946 638 A2 | | 7/2008 |
| EP | 2918813 A1 | | 9/2015 |
| JP | 2004068800 A | * | 3/2004 |
| KR | 10-2015-0093035 | | 8/2015 |
| WO | WO 01/11216 A2 | | 2/2001 |
| WO | WO-2013102795 A1 | * | 7/2013 ............... C08F 8/48 |
| WO | WO 2014/056790 A1 | | 4/2014 |
| WO | WO 2014/080266 A1 | | 5/2014 |
| WO | WO 2016/026583 A1 | | 2/2016 |
| WO | WO 2016/177556 A1 | | 11/2016 |
| WO | WO 2018/050394 A1 | | 3/2018 |
| WO | WO 2018/050895 A1 | | 3/2018 |

OTHER PUBLICATIONS

International Search Report dated Oct. 23, 2018 in PCT/EP2018/068128 filed on Jul. 4, 2018, 5 pages.

* cited by examiner

VEHICLE SYSTEM AND METHOD FOR INJECTING AN AQUEOUS SOLUTION IN THE COMBUSTION CHAMBER OF THE INTERNAL COMBUSTION ENGINE

FIELD OF THE DISCLOSURE

The present disclosure relates to a vehicle system for injecting an aqueous solution in the combustion chamber of the internal combustion engine. A further aspect of the disclosure relates to a method for injecting an aqueous solution by means of a system according to the disclosure.

Due to increasing requirements for reduced carbon dioxide emissions, substantial focus has been paid to optimization of fuel consumption of internal combustion engines. However, this optimization is limited by premature ignition of the fuel and high exhaust gas temperatures. One possible measure for reducing the exhaust gas temperatures and the premature ignition is the injection of water into the combustion chamber. In internal combustion engines, water injection system can spray water into the incoming air or fuel-air mixture, or directly into the combustion chamber to cool certain parts of the combustion chamber where "hot points" could produce premature ignition. Many water injection systems use a mixture of water and alcohol or other additives. The water provides the primary cooling effect due to its great density and high heat absorption properties. The alcohol is combustible and serves as an anti-freezing for the water. One known example of where a separate water injection system can be provided for enabling water injection into the combustion chamber of an internal combustion engine is WO 2014/080266 A1.

A known problem with water injection systems is that water can contain impurities that, in turn, promote the growth of microbial species such as bacteria, algae, fungi or other microorganisms. Microbial contamination is particularly possible in the water tank when the vehicle is immobilized for a long period of time. Such contamination can lead to a malfunction of the system up to the failure as well as clogging of filters which are arranged in the water injection system. To prevent microbial contamination or to eradicate an already present contamination, one could think about using chemical products. However, the injection of such chemicals into the combustion chamber can lead to other problems.

WO2016/177556 A1 proposes to decontaminate water contained in a water tank for a water injection system by exposing the water to UV radiation. This solution is not optimal for several reasons. First, the UV radiator must be energized to produce a decontaminating effect. Second, the growth of microbial species, such as bacteria, algae, fungi or other microorganisms is not inhibited when the vehicle is immobilized for a long period and the UV radiator not energized. This has a further deleterious effect on the water system in that the microorganisms contaminating water alter the chemical properties of the water by releasing ionic species. The chemical properties of the water cannot be later reversed to the initial state even if the water is later decontaminated (for example with chemicals or UV radiations).

Moreover, UV radiators are expensive and complex. They are also relatively fragile so that they must be replaced periodically. Their location in the water tank makes the replacement operation difficult and costly. These factors make the use of UV radiators impractical.

SUMMARY

The present disclosure provides an improved vehicle system for injecting an aqueous solution into the combustion chamber of an internal combustion engine, which overcomes the foregoing problems heretofore existing in the industry.

In particular, it is a first objective of the present disclosure to provide an aqueous solution injection system that does not require to be energized in order to be operational, which prevents contamination even in case of extended periods of parking or other inactivity of the vehicle in which the aqueous solution injection system is installed.

A second objective of the present disclosure is to provide an aqueous solution injection system that is less expensive and which does not require extensive, expensive and frequent maintenance operations.

According to a first embodiment of the present disclosure, these objectives are achieved with a vehicle system configured for injecting an aqueous solution into an air intake line upstream of a combustion chamber of an internal combustion engine, or in the combustion chamber of the internal combustion engine, said vehicle system comprising the following vehicle system constituents:

a tank to store an aqueous solution;

a pump;

an air intake line upstream of a combustion chamber of an internal combustion engine;

one or more injectors to inject aqueous solution into the air intake line, into the combustion chamber or both;

a feed line to feed said injector with aqueous solution pumped by the pump.

According to the present disclosure, at least a portion of at least one of the vehicle system constituents, or a tank component is made of polymer material, and the polymer material:

comprises an effective amount of at least one antimicrobial agent, or has on its surface a surface coating comprising at least one antimicrobial agent, the surface coating comprising between 10 to 2500 ppm (0.001% by weight and 0.25% by weight) of the at least one antimicrobial agent. By way of example, the surface coating may contain 100-1000 ppm (0.01% by weight-0.1% by weight) when the antimicrobial agent is zinc pyrithione or 4,5-dichloro-2-octyl-4-isothiazolin-3-one (DCOIT), and minimum 15 ppm (0.0015% by weight) when the antimicrobial agent is silver.

An "antimicrobial agent" refers to any agent that prevents the development of microbial species such as bacteria, algae and/or fungi. It is preferred within the present disclosure that the antimicrobial agent be a chemical compound. The antimicrobial effect of the antimicrobial agent is measured according to the norm ISO22196:2011 or to the norm ISO 16869:2008 depending on the nature of the microbial species.

"An effective amount" is an amount that will produce the effect of inhibiting the growth of microbial species by at least 80% as measured according to the norm ISO22196:2011 or will give a ratio of 0 (no growth) preferably, or 1 (initial growth) according to the norm ISO 16869:2008 depending on the nature of the microbial species.

The inventors have noted that the microbial species contaminating aqueous solutions in an aqueous solution injection system tend to adhere to the surfaces constituting the tank rather than remaining suspended in the aqueous solution. Consequently, the concept of decontaminating the aqueous solution via the surfaces of the system constituents is particularly operative.

The polymer material constituting the vehicle system constituents or a tank component comprises at least 0.0002% by weight, preferably at least 0.0015% by weight, more preferably at least 0.01% by weight, the most preferably at least 0.03% by weight, of at least one antimicrobial agent. Within the context of the present disclosure, the % by weight is the ratio between the mass of the antimicrobial agent and the polymer material.

Preferably, the polymer material constituting the vehicle system constituents or a tank component comprises at most 5% by weight, preferably at most 0.5% by weight, more preferably at most 0.4% by weight, more preferably at most 0.3% by weight, more preferably at most 0.27% by weight, the most preferably at most 0.25% by weight, of at least one antimicrobial agent.

The inventors have surprisingly found that, in addition to an effective antimicrobial effect, the foregoing content of the antimicrobial agent in the polymer material will also allow ice resistance while still permitting weldable walls.

By the expression "weldable wall", it is meant that the wall made of a polymer material comprising at least one antimicrobial agent according to the present disclosure is weldable to an element made of the same polymer material containing or not containing the at least one antimicrobial agent. The welding phenomenon is defined as follows: Once polymer-to-polymer contact is achieved at the interface, intermolecular diffusion and entanglement is needed to complete the process and form a good weld. Autohesion is the phenomenon describing the intermolecular diffusion and chain entanglement across a thermoplastic polymer interface forming a strong bond. Unlike adhesion, which relies on surface energetics (or secondary chemical bonds between (dis)similar materials), autohesion relies on chain entanglement and secondary bonds for polymer chains of similar materials. As shown in Plastics and Composites Welding handbook, Grewell/Benatar/Park, page 23, "under ideal conditions, the diffusion is complete when the interface is no longer discernible from the bulk".

Ice resistance is also a key property of the polymer material. By changing from liquid stage to solid stage, the volume of the water increases. This volume increase generates high stresses on the walls of the tank. The mechanical properties of the polymer material are important and, in particular, the stress at yield and strain at yield must be high enough to accommodate this stress. These properties are measured according to ISO 527 standard at 10 mm/min (and 1 mm/min for the Young modulus).

More preferably, the amount of the antimicrobial agent is in the range of 0.0002% by weight to 5% of weight, preferably from 0.0015% by weight to 0.4% by weight, more preferably from 0.005% by weight to 0.3% by weight, the most preferably from 0.01% by weight to 0.25%. These amounts allow an antimicrobial effect, ice resistance and weldable walls.

In an embodiment, the antimicrobial agent is an organic or an inorganic antimicrobial agent. The organic or inorganic antimicrobial agent may be selected from, for example, the group consisting of antimicrobial minerals such as natural clays (for example bentonite) containing soluble reduced metals, expandable clay minerals that absorb cations, providing a capacity for extended metal release and production of toxic hydroxyl radicals; chitosan, 10,10'-oxybisphenoxarsine (OBPA); 2-octyl-2H-isothiazol-3-one (OIT); 2-butyl-1,2-benzisothiazolin-3-one; iodo-propylbutyl carbamate (IPBC); titanium dioxide nanoparticles metal; 4,5-dichloro-2-octyl-4-isothiazolin-3-one (DCOIT). When the antimicrobial agent comprised in the polymer material that makes at least one portion of at least one of the vehicle system constituents or of a tank component is DCOIT, the amount is preferably comprised within the range of 0.0002% by weight to 5% by weight, more preferably from 0.0015% by weight to 0.4% by weight, more preferably from 0.005% by weight to 0.3% by weight, more preferably from 0.01% by weight to 0.25% by weight, the most preferably 0.25% by weight.

In an embodiment, one of the antimicrobial agents is an antimicrobial metallic compound. Said antimicrobial metallic compound contains at least one metallic atom. The metallic part of the antimicrobial metallic compound has antimicrobial properties.

The antimicrobial metallic compound may be selected from the group consisting of metals, metallic alloys, metallic solutions, metallic salts, metallic oxides and metallic complexes. The at least one antimicrobial metallic compound is preferably a nanomaterial. The term "nanomaterial" means an antimicrobial metallic compound in the form of particles in an unbound state or as an aggregate or as an agglomerate and where, for 50% or more of the particles in the number size distribution, one or more external dimensions is in the size range 1-100 nm. Preferably the antimicrobial metallic compound is in the form of nanoparticles having a diameter in the range of 1 to 10 nm. The antimicrobial metallic compound nanomaterial may be supported or dispersed on silicon oxide particles, aluminum oxide particle or zeolite.

According to an embodiment, the at least one antimicrobial metallic compound comprises a metal selected from the group consisting of copper, silver, zinc, aluminum, nickel, gold, barium, tin, bore, thallium, antimony, cobalt, zirconium and molybdenum, preferably selected from the group consisting of copper, zinc and silver, the most preferably zinc and silver. Zinc and silver are more efficient against the targeted microbial species.

According to an embodiment, the at least one antimicrobial metallic compound is an antimicrobial metallic compound of copper selected from the group consisting of copper, brass, bronze, cupronickel alloy, copper-nickel-zinc alloy, copper sulphate (I, II), coper oxide (I, II), copper hydroxide (I, II), copper pyrithione (I).

According to an embodiment, the at least one antimicrobial metallic compound is an antimicrobial metallic compound of zinc and/or an antimicrobial metallic compound of silver. Preferably, the antimicrobial metallic compound of zinc is selected from the group consisting of zinc, zinc oxide and zinc pyrithione. The antimicrobial metallic compound of silver is preferably selected from the group consisting of silver, silver oxide, silver nitrate, silver chloride and silver carbonate. Where the antimicrobial metallic compound is zinc pyrithione it is preferred that the zinc pyrithione is present in an amount of 0,0002% by weight and 5% of weight, preferably between 0.0015% by weight and 0.4% by weight, more preferably between 0.005% by weight and 0.3% by weight, more preferably between 0.01% by weight and 0.25% by weight, the most preferably 0.2% by weight.

In an embodiment, the antimicrobial agent is an organometallic compound. Indeed, the inventors have realized that by appropriately selecting the organic part of the compound, release of the agent or metal part (ions) thereof in water is prevented.

In an embodiment, the at least one antimicrobial metallic compound is zinc pyrithione or a silver salt or silver or a combination thereof. The inventors have surprisingly observed that even though pyrithione is hardly miscible in polymers, for example polyolefin, it appears that zinc pyrithione or silver salts or silver, preferably silver nanoparticles, are well encapsulated in the polyolefin matrix and that only an insignificant amount of metal ions is released into water.

According to the present disclosure, the polymer constituting the vehicle system constituents or a tank component can be a mixture of polymers. Examples of suitable polymers are polyolefin and polyamides. According to an embodiment, the polymer is a polyolefin, preferably containing ethylene and even more preferably, is high density polyethylene. Thereby the constituent is easier to weld and/or assemble and has increased resistance to ice expansion. Moreover, the high-density polyethylene is not a water absorbent polymer.

The polymer can be prepared either by applying a surface coating comprising an antimicrobial agent on the polymer surface which is in contact with the aqueous solution or by embedding an antimicrobial agent into the polymer bulk. Preferably, the antimicrobial agent is embedded in the polymer, permitting long term effectivity and durability compared to biocide coating which can leach out the biocide agent more rapidly. When the antimicrobial agent comprised in the polymer material is zinc pyrithione at an amount of about 0.02% by weight, a leaching rate (quantity of zinc cations released into the aqueous solution) between 1 and $8 \times 10^{-3}$ mg/dm$^2$/day into a non-stirred aqueous solution stored in a tank made of this polymer material was observed at 50° C. When the antimicrobial agent comprised in the polymer material is silver metal nanoparticles at an amount of about 0.2% by weight, a leaching rate between 1 and $10 \times 10^{-5}$ mg/dm$^2$/day into a non-stirred aqueous solution stored in a tank made of this polymer material was observed at 50° C.

Wherein when the polymer material has a surface coating comprising at least one antimicrobial agent, the surface coating comprises between 0.001% by weight and 0.25% by weight of the at least one antimicrobial agent. By way of example, the surface coating may contain 100-1000 ppm (0.01% by weight-0.1% by weight) when the antimicrobial agent is zinc pyrithione or DCOIT, and minimum 15 ppm (0.0015% by weight) when the antimicrobial agent is silver.

According to an embodiment, the antimicrobial metallic compound is homogeneously dispersed in the polymer material. By the expression "homogeneously dispersed", it is meant that the concentration of the antimicrobial metallic compounds within the polymer remains the same in average independently of the elementary volume of polymer material considered. For instance, the concentration of the antimicrobial metallic compound in the polymer material of a same vehicle system constituent can vary from an elementary volume of 1 mm$^3$ to another of at most 30%, preferably of at most 10% by weight, most preferably of at most 5%.

Advantageously, the antimicrobial agent is present in any part of the water injection system that is in contact with water. Very advantageously, such antimicrobial agent can be present in walls of the tank for storing the aqueous solution or in elements included in the tank. Indeed, water is supposed to remain in contact with the tank walls and with elements included in the tank for a longer time than in any other part of the system so that the antimicrobial agent is able to operate continuously. Examples of elements included in the tank (i.e., tank components) comprise baffles, supports for sensors, floaters and filters.

In a particular embodiment, the tank contains a heater for heating the aqueous solution and the antimicrobial agent is contained in the heater. The heat is indeed expected to promote the growth of microbial species such as bacteria, algae, fungi or other microorganisms so that these will concentrate in hotter spots in the tank. Thanks to the present disclosure, the contamination on or around the heater can also be eliminated.

In a particular embodiment, the vehicle system configured for injecting the aqueous solution contains a filter for filtering the aqueous solution and the antimicrobial agent is contained in or on the filter.

In a particular embodiment, the vehicle system configured for injecting the aqueous solution contains a water delivery module and the antimicrobial agent is contained in or on the surface of the water delivery module.

In another advantageous embodiment, such antimicrobial agent can be present in the pump. Stirring effect of the pump is indeed increasing the contact of water with the building elements of the pump and thereby the antimicrobial effect of the agent.

In a preferred embodiment, the antimicrobial agent is present in a plurality of constituents of the system to maximize the antimicrobial effect.

In the present disclosure one or more of the constituents that may contain the antimicrobial agent are made of several layers. Therefore, it is envisioned that, advantageously, at least a layer being in contact with the aqueous solution will contain the antimicrobial agent.

According to a preferred embodiment, the at least one antimicrobial metallic compound is silver, preferably silver nanoparticles in an amount comprised in the range of 0,0002% by weight to 5% by weight, preferably from 0.0015% by weight to 0.4% by weight, more preferably from 0.005% by weight to 0.3% by weight, the most preferably from 0.01% by weight to 0.25% by weight.

Advantageously, the surface of the vehicle system constituent (such as for example a tank wall or a pump) or of the component included in the tank is textured so as to promote interactions between the aqueous solution and the antimicrobial agent by offering a larger contact area between the aqueous solution and the surface of the constituent or of the component.

In a particular embodiment of the invention, the vehicle system for injecting an aqueous solution also contains an UV radiator. The combination of both the antimicrobial agent contained in at least a portion of at least one of the vehicle system constituents and of the UV radiator permits complete inhibition of growth of microbial species, such as bacteria, algae, fungi or other microorganisms, as measured according to the norm ISO22196:2011 or to the norm ISO 16869:2008. The UV radiator acts when the vehicle is active and eradicates most of the microbial species present in the system while the antimicrobial agent will prevent the growth of the microbial species when the vehicle is immobilized, even for a long period.

According to a second aspect, there is provided a method for injecting an aqueous solution into an air intake line upstream of a combustion chamber of an internal combustion engine, or into the combustion chamber of the internal combustion engine, comprising:

pumping the aqueous solution out of a tank with a pump, feeding with a feeding line an injector with aqueous solution pumped by the pump, and injecting said aqueous solution into the air intake line or into the combustion chamber with the injector.

According to the present disclosure, at least a portion of the pump, tank, intake line, injector or feeding line or a component of the tank is made of a polymer:

comprising an effective amount of at least one antimicrobial agent, or having on its surface a surface coating comprising at least one antimicrobial agent, the surface coating between 0.001% by weight and 0.25% by weight of the at least one antimicrobial agent.

According to the present disclosure, at least a portion of the pump, tank, intake line, injector or feeding line is made of a polyolefin comprises an effective amount of antimicrobial agent.

Finally, the water tank according to the present disclosure is manufactured by injection molding, by blow molding or by thermoforming.

BRIEF DESCRIPTION OF THE DRAWINGS

The present disclosure will be better understood on reading the following examples, including figures, which are given by way of example.

DETAILED DESCRIPTION

Figure 8:
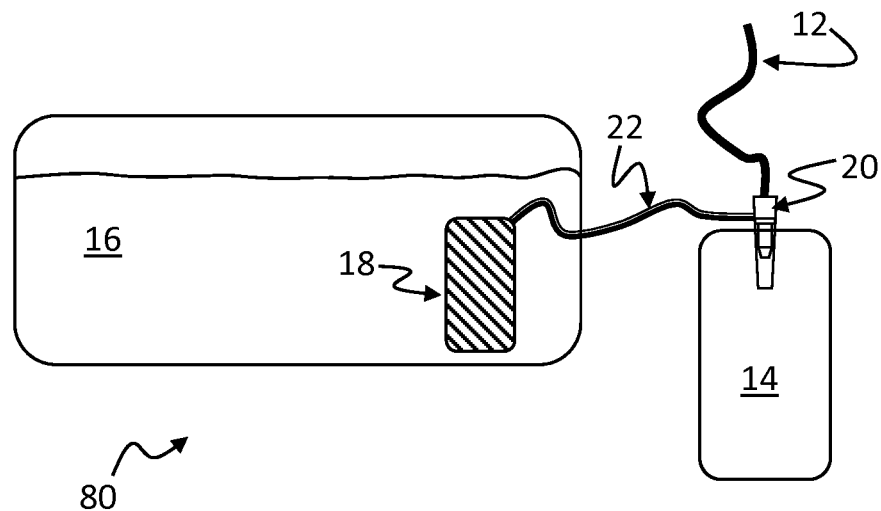
FIGS. 8-10 depicts three vehicle systems according to embodiments of the present disclosure.
Figure 9:
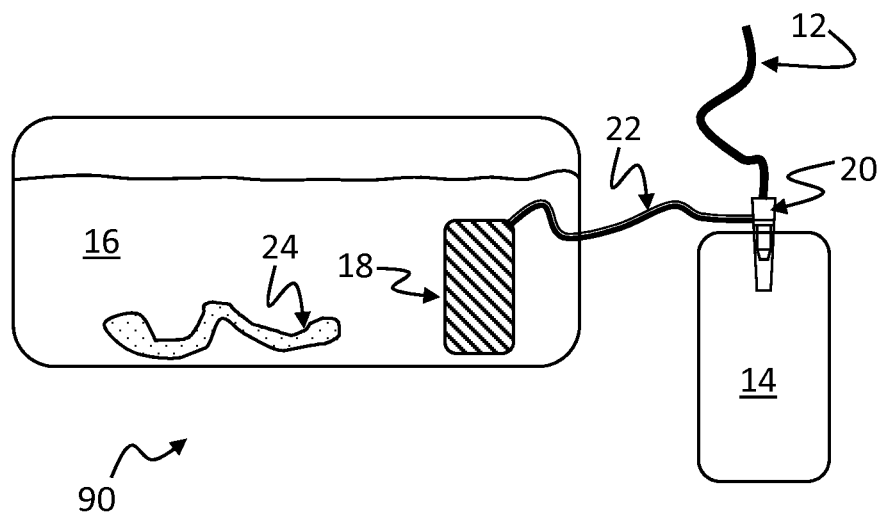
Figure 10:
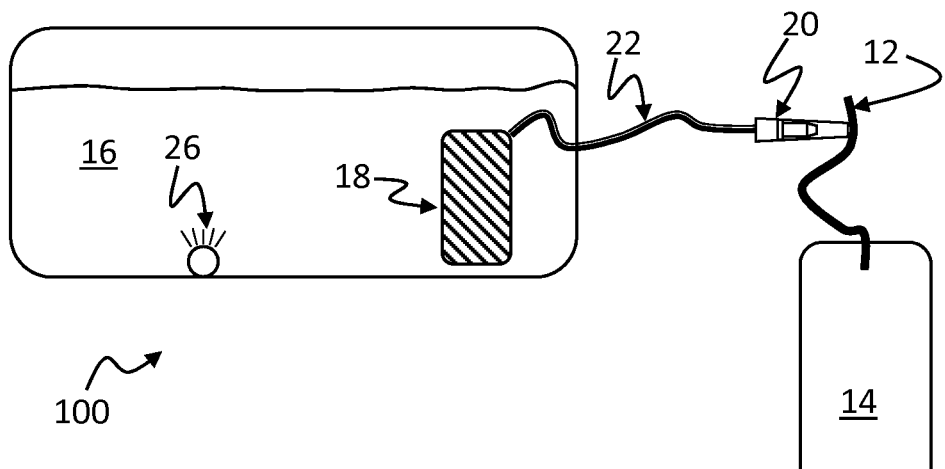

In FIGS. 8 to 10, one can see a vehicle system 100 configured for injecting an aqueous solution into an air intake line 12 upstream of a combustion chamber 14 of an internal combustion engine, or vehicle system 80, 90 configured for injecting an aqueous solution, preferably demineralized water, in the combustion chamber 14 of the internal combustion engine. Said vehicle systems comprise the following vehicle system constituents: a tank 16 to store an aqueous solution, a pump 18, an air intake line 12 upstream of a combustion chamber 14, one or more injectors 20 to inject aqueous solution into the air intake line 12, into the combustion chamber 14 or both; and a feed line 22 to feed said injector 20 with aqueous solution pumped by the pump 18.

At least a portion of at least one of the vehicle system constituents 12, 16, 18, 20, 22 of the system 80, 90, 100, or of a tank component, for example a flexible heater 24 is made of polymer material, the polymer material comprising an effective amount of at least one antimicrobial agent.

In FIG. 10, the system 100 further comprises a UV radiator 26. The UV radiator acts synergistically with the antimicrobial agent.

Preferably, one wall of the tank 16 in contact with the aqueous solution is made of a polymer material comprising at least one antimicrobial metallic compound. The one or more injectors 20 and the feed line(s) 22 are often purged before parking of the vehicle to prevent any damage due to possible freezing of the aqueous solution, preferably demineralized water. During the purge, microbial species such as bacteria and/or algae and/or fungi and nutriments could be sucked inside the aqueous tank 16, preferably the demineralized tank 16. In order to prevent any microbial species growth, and biofilm formation and to protect the vehicle system 80, 90, 100 for injecting the aqueous solution in the combustion chamber 14 of the internal combustion engine, the polymer material constituting at least one wall of the tank 16 in contact with the aqueous solution comprises at least one antimicrobial metallic compound. The antimicrobial metallic compound is in an amount comprised in the range of 0.0002% by weight to 5% by weight, preferably from 0.0015% by weight to 0.4% by weight, more preferably from 0.005% by weight to 0.3% by weight, the most preferably from 0.01% by weight to 0.25% by weight. Such an amount of antimicrobial metallic compounds results simultaneously in a weldable wall tank needed for the manufacturing of the tank, ice resistance, and antimicrobial property permitting to avoid a clogging of vehicle system for injecting the aqueous solution in the combustion chamber of the internal combustion engine. Therefore, the amount of antimicrobial agent is effective.

EXAMPLES

In order to reproduce the effect of a bacterial contamination in the tank and to study the antimicrobial effect of the addition of an antimicrobial metallic compound in the walls of tank, the following experiments were performed.

4 water tanks were tested:

a reference tank (a) made of High Density Polyethylene (HDPE) without antimicrobial metallic compound (control), a tank (b) made of HDPE containing 0.2% by weight of an antimicrobial metallic compound of zinc, said antimicrobial metallic compound of zinc being zinc pyrithione, a tank (c) made of HDPE containing 0.034% by weight of an antimicrobial metallic compound of silver, said antimicrobial metallic compound of silver being silver metal nanoparticles, a tank (d) made of HDPE containing 0.1% by weight of an antimicrobial metallic compound of zinc, said antimicrobial metallic compound of zinc being zinc pyrithione, and 0.017% by weight of an antimicrobial metallic compound of silver, said antimicrobial metallic compound of silver being silver metal nanoparticles.

All the tanks tested were manufactured by injection molding and were made of 2 half shells, welded together by hot plate. It has been observed that the tanks comprising antimicrobial agents according to the present disclosure contain weldable walls.

The tested tanks have a capacity of 24 liters and were filled with 15 liters of non-sterile demineralized water containing less than 1000 bacteria/ml and having a conductivity of less than 1 µS/cm and a turbidity of 0.

To reproduce an introduction of nutrients into the tank due to the purge effect, a nutrient aqueous solution of 15 ml of an aqueous solution containing 2 g/l of tryptone, 1 g/l of yeast extract and 2 g/l 40% of NaCl, was introduced in the tank according to the following cycle, that simulates also a park/drive park condition:

a. Filling the tank with demineralized water
   b. Agitation of the solution during 1H
   c. Addition of 15 ml of the nutrient aqueous solution
   d. Agitation stopped during 6H
   e. Agitation of the solution during 1H
   f. Addition of 15 ml of a nutrient aqueous solution
   g. Agitation stopped during 16H.

All the compounds used were provided by VWR chemicals. Samples of the solution contained in the tanks were taken for analysis after step e, the turbidity and the conductivity of said samples being measured with the spectrophotometer SPECTROstar nano from BMG LABTECH using a wavelength of 600 nm (visible light) for the turbidity and the Versa Star meter from Thermo Fischer equipped with a VSTAR-ISE module and Orion TM DuraProbe™ 4-Electrode Conductivity Cell for conductivity. The temperature of the solution contained in the tank was maintained at 37° C.

Figure 1:
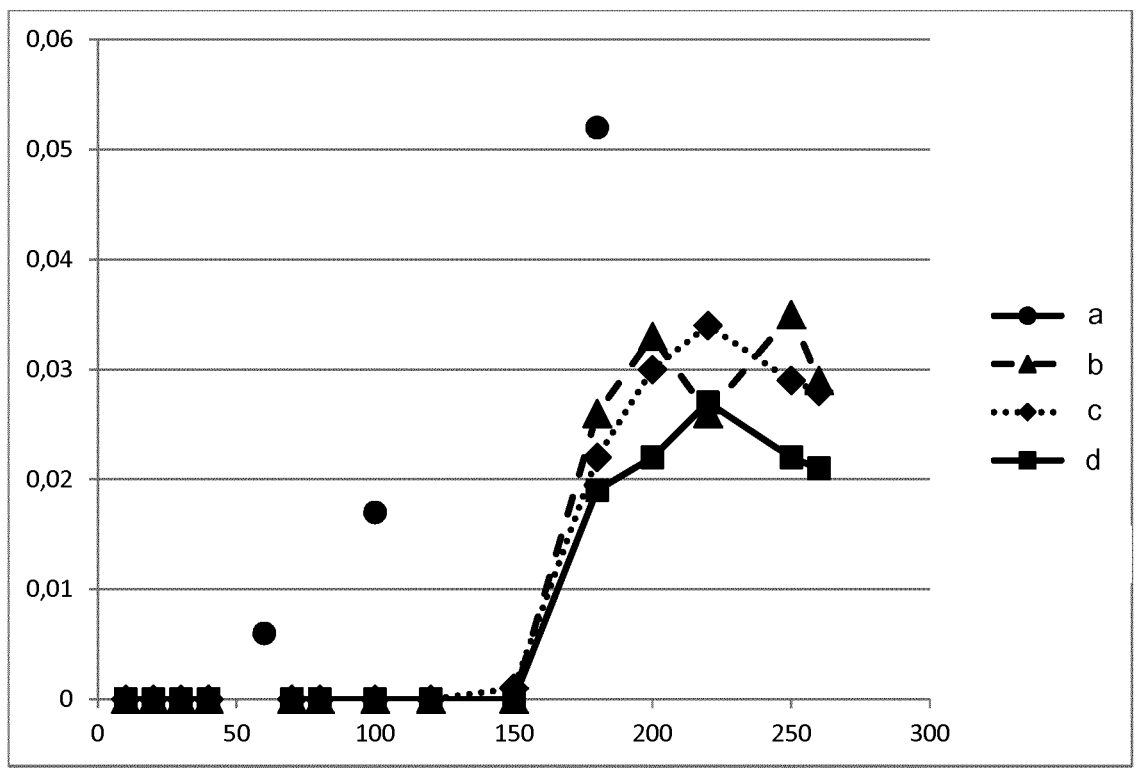
FIG. 1 presents the measure of turbidity of water incubated with nutriments in a control tank (a) and in three tanks according to the invention (b, c and d).
Figure 2:
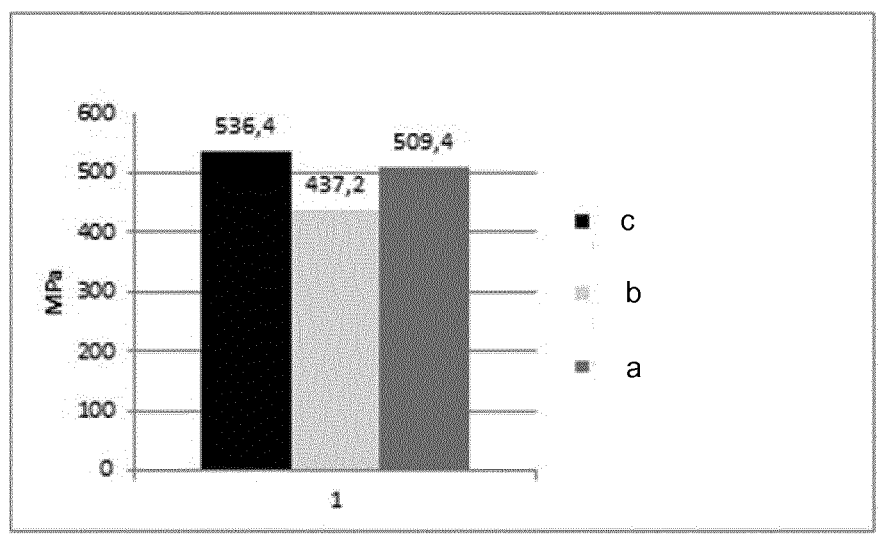
FIGS. 2, 3, 4, and 5 present, for a control polymer (in grey) and polymers according to the invention (in black and light grey), respectively the tensile modulus, the tensile stress at yield comparison, the tensile strain at yield comparison, and the tensile strain at break comparison.
Figure 3:
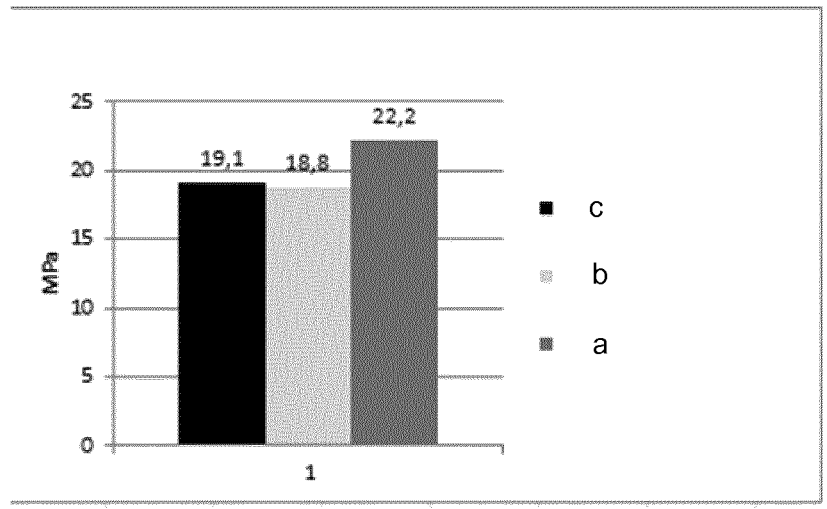
Figure 4:
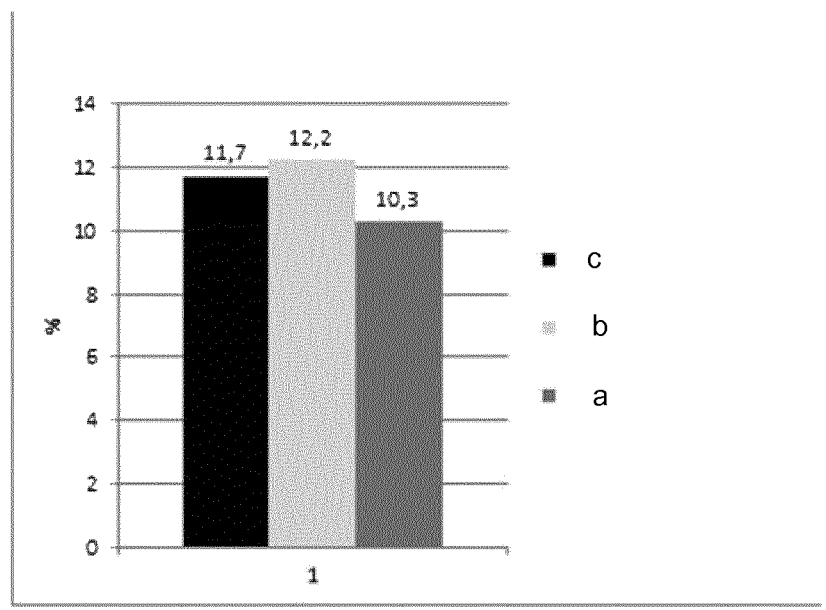
Figure 5:
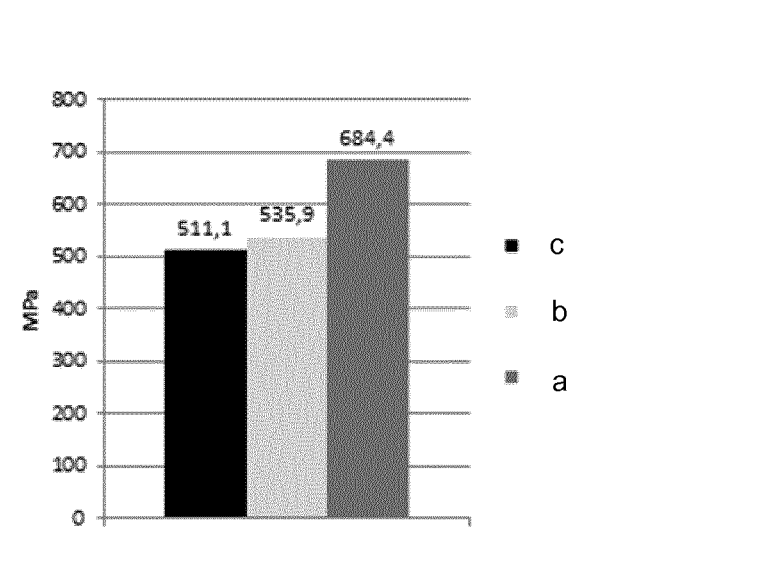

FIG. 1 shows the evolution of the turbidity (Y axis) at O.D. 600 nm of the solution contained in samples a, b, c and d with the amount of nutrients added over the time, whose concentration in mg/l is represented in axis X. A turbidity increase corresponds to an increase of the bacterial amount in the solution. The evolution of the curve shows the effect of the antimicrobial metallic compound present in the wall of the tank. The turbidity is lower in tanks (b) and (c), containing antimicrobial agents than in control tank (a). In addition, with half the amount of each antimicrobial agent used in tanks (b) and (c), the turbidity is even lower in tank (d), which shows a synergetic effect of the combination of an antimicrobial metallic compound of zinc with an antimicrobial metallic compound of silver was observed.

Furthermore, the antimicrobial activity was measured on vehicle systems depicted on FIGS. 8 and 9, where at least a portion of at least one of the vehicle system constituents 12, 16, 18, 20, 22 or of a tank component 24, is made of polymer material comprising an effective amount of at least one antimicrobial agent. The antimicrobial effect of the antimicrobial agent was measured according to the norm ISO22196:2011. The same measurement was conducted on vehicle system 100 depicted on FIG. 10, further comprising a UV radiator 26. As for systems on FIGS. 8 and 9, the antimicrobial activity was reduced by 99%. As for system on FIG. 10, with a UV radiator, the antimicrobial activity was reduced by (99.999%). Therefore, the combination of both the antimicrobial agent contained in at least a portion of at least one of the vehicle system constituents and of the UV radiator permits an almost complete inhibition of growth of microbial species.

Release of metal ions in water was analyzed in tanks b), c) and d) after demineralized water was left for 105 days at ambient temperature (between 18 and 25° C.). Measures by ICP AES (Inductively Coupled Plasma Atomic Emission Spectroscopy) showed no release of Ag and release of Zn limited in a range of 1 mg/l. Therefore, only an insignificant amount of metal ions was released into water.

Traction tests were also conducted to evaluate the impact of the antimicrobial metallic compounds on the resistance of a polymer. Said polymer being for instance HDPE and more particularly HDPE GX5038. Said tests were conducted with concentration in metallic compounds of 0.2% weight zinc (in light grey) and 0.034% weight silver (in black) samples. Samples were submitted to traction tests consisting of increasing stresses to samples by pulling on one side of it while the other extremity was blocked mechanically whilst the tensile modulus (Young modulus), tensile stress at yield, tensile stress at break and strain at break are measured. Measurements were performed according to ISO 527, i.e. 1 BA at 23° C. and at 10 mm/min for tensile stress at yield, tensile stress at break and strain at break, and 1 BA at 23° C. and at 1 mm/min for tensile modulus. The results of these tests are shown on FIGS. 2 to 5, said results being an average taken on three samples. Results for a control polymer are shown in grey, and results for polymers according to the invention are shown in black (0.034% by weight silver nanoparticles) and light grey (0.2% by weight zinc pyrithione). Similar tests were conducted to study the influence of temperature on the resistance of the polymer. For these tests, the conditions were the same except that temperature varied.

Measured values for polymers according to the present disclosure are in the same order as for a control polymer regarding tensile modulus (FIG. 2, Y axis expressed in MPa), tensile stress at yield comparison (FIG. 3, Y axis expressed in MPa), tensile strain at yield comparison (FIG. 4, Y axis expressed in %) and tensile strain at break comparison (FIG. 5, Y axis expressed in MPa), which demonstrates that polymers according to the present disclosure have a good resistance.

Figure 6:
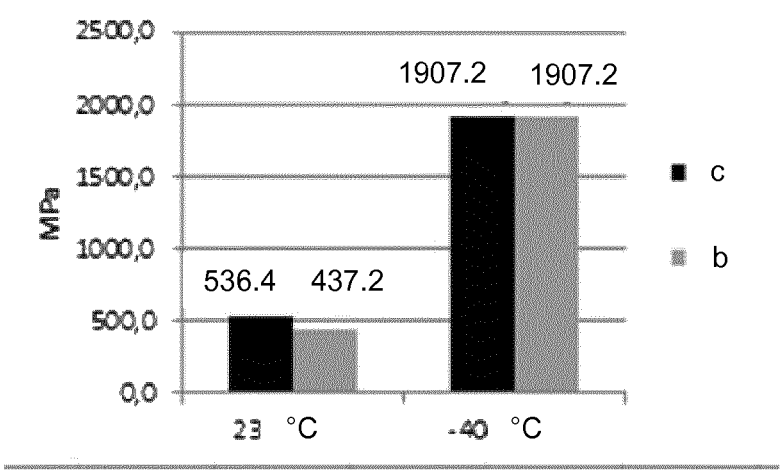
FIGS. 6 and 7 present the effect of temperature on respectively the tensile modulus and the stress at yield of polymers according to the present disclosure.
Figure 7:
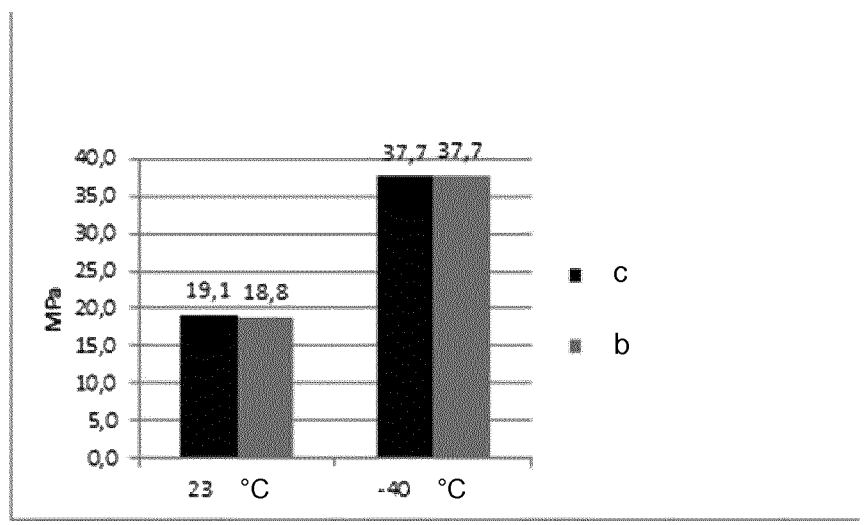

Tensile modulus and tensile stress at yield comparison were also measured for polymers according to the present disclosure at −40° C. (FIG. 6, Y axis expressed in MPa, FIG. 7, Y axis expressed in MPa). Results for polymers according to the present disclosure are shown in black (0.034% by weight silver nanoparticles) and light grey (0.2% by weight zinc pyrithione). These results confirm that tensile modulus and stress at yield are even higher at −40° C. and show that polymer materials according to the present disclosure behaves very similarly to pure ethylene material which ensures its good response to ice formation.

The invention claimed is:

1. A vehicle system configured for injecting an aqueous solution into an air intake line upstream of a combustion chamber of an internal combustion engine, or in the combustion chamber of the internal combustion engine, said vehicle system comprising the following vehicle system constituents:
   a tank to store an aqueous solution;
   a pump;
   an air intake line upstream of a combustion chamber of an internal combustion engine;
   one or more injectors to inject aqueous solution into the air intake line, into the combustion chamber or both; and
   a feed line configured for feeding said injector with aqueous solution pumped by the pump,
   wherein at least a portion of at least one of the vehicle system constituents or of a tank component is made of polymer material, the polymer material
   comprising a polyolefin or a polyamide, and an effective amount of at least one antimicrobial agent,
   wherein the polymer material comprises between 0.0002% by weight and 5% of weight of the at least one antimicrobial agent, the polymer material is ice resistant, and the polymer material is weldable to an element made of the same polymer material containing or not containing the at least one antimicrobial agent, and
   wherein the at least one antimicrobial agent has a leaching rate between $10^{-5}$ mg/dm$^2$/day and $8\times10^{-3}$ mg/dm$^2$/day into a non-stirred aqueous solution stored in a tank made of the polymer material at 50° C.

2. The vehicle system according to claim 1, wherein the polymer material comprises at least 0.0015% by weight of the at least one antimicrobial agent.

3. The vehicle system according to claim 2, wherein the polymer material comprises at most 0.5% by weight of the at least one antimicrobial agent.

4. The vehicle system according to claim 2, wherein the polymer material comprises between 0.0015% by weight to 0.5% by weight of the at least one antimicrobial agent.

5. The vehicle system according to claim 1, wherein the at least one antimicrobial agent is at least one antimicrobial metallic compound.

6. The vehicle system according to claim 5, wherein the at least one antimicrobial metallic compound is selected from the group consisting of a metal, a metallic alloy, a metallic solution, a metallic salt, a metallic oxide and a metallic complex.

7. The vehicle system according to claim 5, wherein the metallic part of the at least one antimicrobial metallic compound is selected from the group consisting of copper, silver, zinc, aluminum, nickel, gold, barium, tin, bore, thallium, antimony, cobalt, zirconium and molybdenum.

8. The vehicle system according to claim 5, wherein the at least one antimicrobial metallic compound is zinc pyrithione or a silver salt, or silver or a combination thereof.

9. The vehicle system according to claim 1, wherein the at least one antimicrobial agent is present in at least one wall of the tank in contact with the aqueous solution and/or in a tank component.

10. The vehicle system according to claim 1, wherein the antimicrobial agent is present in the pump.

11. The vehicle system according to any claim 1, further comprising a heater to heat the aqueous solution and wherein the heater comprises the polymer material which comprises the at least one antimicrobial agent or the heater comprises a surface coating which comprises an antimicrobial agent.

12. The vehicle system according to claim 11, wherein the vehicle system constituent or the further constituent is made of several layers, at least a layer being in contact with the aqueous solution, wherein said layer in contact with the aqueous solution comprises the polymer material which comprises the at least one antimicrobial agent.

13. The vehicle system according to claim 1, wherein the polymer material is a polyolefin.

14. The vehicle system according to claim 1, wherein the at least one antimicrobial agent is present in one of the vehicle system constituents and said one of the vehicle system constituents has a textured surface.

15. The vehicle system according to claim 1, further comprising a ultraviolet (UV) radiator.

16. A method for injecting an aqueous solution into an air intake line upstream of a combustion chamber of an internal combustion engine, or into the combustion chamber of the internal combustion engine, comprising:
pumping the aqueous solution out of a tank with a pump,
feeding with a feeding line an injector with aqueous solution pumped by the pump,
injecting said aqueous solution into the air intake line or into the combustion chamber with the injector,
wherein at least a portion of the pump, tank, intake line, injector or feeding line or a component of the tank is made of polymer material
comprising a polyolefin or a polyamide, and an effective amount of at least one antimicrobial agent,
wherein the polymer material comprises between 0.0002% by weight and 5% of weight of the at least one antimicrobial agent, the polymer material is ice resistant, and the polymer material is weldable to an element made of the same polymer material containing or not containing the at least one antimicrobial agent, and
wherein the at least one antimicrobial agent has a leaching rate between $10^{-5}$ mg/dm$^2$/day and $8\times10^{-3}$ mg/dm$^2$/day into a non-stirred aqueous solution stored in a tank made of the polymer material at 50° C.

* * * * *